United States Patent
Martius et al.

(10) Patent No.: US 9,161,141 B2
(45) Date of Patent: Oct. 13, 2015

(54) WIRELESS CHARGING SYSTEM FOR HEARING INSTRUMENTS

(71) Applicant: SIEMENS AKTIENGESELLSCHAFT, Munich (DE)

(72) Inventors: Sebastian Martius, Forchheim (DE); Benjamin Sewiolo, Hoechstadt (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 14/187,503

(22) Filed: Feb. 24, 2014

(65) Prior Publication Data
US 2014/0241557 A1 Aug. 28, 2014

(30) Foreign Application Priority Data
Feb. 22, 2013 (DE) .......................... 10 2013 202 930

(51) Int. Cl.
*H04R 25/00* (2006.01)
*H02J 7/00* (2006.01)
(Continued)

(52) U.S. Cl.
CPC ............. *H04R 25/554* (2013.01); *H01Q 21/24* (2013.01); *H02J 7/0044* (2013.01); *H02J 7/025* (2013.01);
(Continued)

(58) Field of Classification Search
CPC . H04R 2420/07; H04R 1/1041; H04R 5/0335
USPC ............ 381/323, 24, 314, 312, 60, 174, 315, 381/23.1, 22, 320; 455/572, 573
See application file for complete search history.

(56) References Cited

U.S. PATENT DOCUMENTS

| 6,380,896 B1 | 4/2002 | Berger et al. |
| 6,658,124 B1 | 12/2003 | Meadows |

(Continued)

FOREIGN PATENT DOCUMENTS

| DE | 29718104 U1 | 1/1998 |
| DE | 19745101 A1 | 4/1999 |
| DE | 10218124 A1 | 11/2003 |
| WO | 2009100981 A1 | 8/2009 |

OTHER PUBLICATIONS

Sam Davis, "Wireless Power Minimizes Interconnection Problems", Power Electronics Technology, Jul. 2011 www.powerelectronics.com.

*Primary Examiner* — Brian Ensey
*Assistant Examiner* — Julie X Dang
(74) *Attorney, Agent, or Firm* — Laurence A. Greenberg; Werner H. Stemer; Ralph E. Locher

(57) ABSTRACT

A facility is provided for the wireless resonant charging of rechargeable hearing instruments. The hearing instrument is freely positionable in a charging device for charging purposes. The charging device for the wireless charging has a transmit antenna arrangement, a transmit amplifier for actuating the transmit antenna arrangement and a charging space. The transmit antenna arrangement has two feeding points, which are spatially arranged in relation to the charging space such that a circularly polarized electromagnetic field can thus be generated in the charging space. The transmit amplifier actuates the antennas accordingly to generate a circularly polarized electromagnetic field in the charging space. In the process a coil arrangement generates a circularly polarized HF field. A good resonant coupling, even with a tilted hearing instrument, is possible, in other words with an undetermined and unpredictable orientation and position of the receive coil of the hearing instrument.

9 Claims, 3 Drawing Sheets

(51) Int. Cl.
*H02J 7/02* (2006.01)
*H02J 7/04* (2006.01)
*H02J 17/00* (2006.01)
*H01Q 21/24* (2006.01)
*H04B 1/38* (2015.01)

(52) U.S. Cl.
CPC .............. *H02J 7/045* (2013.01); *H02J 17/00* (2013.01); *H04R 25/55* (2013.01); *H04R 25/602* (2013.01); *H04R 2225/31* (2013.01); *H04R 2225/33* (2013.01); *H04R 2225/51* (2013.01); *H04R 2460/17* (2013.01)

(56) References Cited

U.S. PATENT DOCUMENTS

| | | |
|---|---|---|
| 2005/0156560 A1 | 7/2005 | Shimaoka et al. |
| 2007/0255350 A1* | 11/2007 | Torgerson et al. ............. 607/61 |
| 2009/0096413 A1 | 4/2009 | Partovi et al. |
| 2009/0285426 A1* | 11/2009 | Boguslavskij ................ 381/323 |
| 2010/0201311 A1 | 8/2010 | Lyell Kirby et al. |
| 2010/0207822 A1 | 8/2010 | Sotoudeh |
| 2011/0062916 A1* | 3/2011 | Farahani ...................... 320/108 |
| 2011/0254503 A1 | 10/2011 | Widmer et al. |

* cited by examiner

WIRELESS CHARGING SYSTEM FOR HEARING INSTRUMENTS

CROSS-REFERENCE TO RELATED APPLICATION

This application claims the priority, under 35 U.S.C. §119, of German application DE 10 2013 202 930.6, filed Feb. 22, 2013; the prior application is herewith incorporated by reference in its entirety.

BACKGROUND OF THE INVENTION

Field of the Invention

The invention relates to a facility for the wireless resonant charging of rechargeable hearing instruments.

Hearing instruments can be embodied for instance as hearing devices. A hearing device is used to supply a hearing-impaired person with acoustic ambient signals which are processed and amplified in order to compensate for or treat the respective hearing impairment. It consists in principal of one or more input transducers, a signal processing facility, an amplification facility and an output converter. The input transducer is generally a sound receiver, e.g. a microphone, and/or an electromagnetic receiver, e.g. an induction coil. The output transducer is usually implemented as an electro acoustic converter, e.g. a miniature loudspeaker, or as an electro-mechanical converter, e.g. a bone conduction earpiece. It is also referred to as an earpiece or receiver. The output transducer generates output signals, which are routed to the ear of the patient and are to generate a hearing perception in the patient. The amplifier is generally integrated in the signal processing facility. Power is supplied to the hearing device by a battery integrated in the hearing device housing. The essential components of a hearing device are generally arranged on a printed circuit board as a circuit substrate or connected thereto.

Besides hearing devices, hearing instruments can also be embodied as so-called tinnitus maskers. Tinnitus maskers are used to treat tinnitus patients. They generate acoustic output signals dependent on the respective hearing impairment and, depending on the working principle, also on ambient noises, the output signals possibly contributing to reducing the perception of interfering tinnitus or other ear noises.

Furthermore, hearing instruments can also be embodied as telephones, cell phones, headsets, earphones, MP3 players or other electronic telecommunication or entertainment systems.

The term hearing instrument is to be understood below both as hearing devices, and also tinnitus maskers, comparable devices of suchlike as well as electronic telecommunication and entertainment systems.

Hearing instruments are usually operated with batteries. The operating life in such cases is limited in terms of time in each instance, depending on the energy content of the batteries and the demand on the hearing instrument. In the light of the general tendency toward miniaturization, batteries with a small installation size are preferred, thereby additionally limiting their energy content.

In order to avoid frequently replacing empty batteries, hearing instruments can be operated with rechargeable batteries. NiMH batteries are widely used for instance; a more recent, very widely-used battery technology involves lithium-ion batteries.

Batteries of hearing instruments are usually charged galvanically by way of metal contacts on the device. For regulatory reasons in an increasing number of countries, medical products are not permitted to have any live points. Furthermore, moisture, sweat and other electrolyte-containing fluids and impurities result in corrosion on the metal contacts. Lithium-ion batteries have higher operating voltages than NiMH batteries, which further intensifies the problem both in terms of the regulatory aspect and also corrosion.

In order to avoid galvanic metal contacts, wireless charging systems can be used. The article titled "Wireless Power Minimizes Interconnection Problems", by Sam Davis, Power Electronics Technology, July 2011, page 10ff explains the physical and electrodynamic basis of wireless charging systems based on magnetic induction. For high efficiency of the coupling, a small distance and as exact an alignment as possible between the transmit and receive antennas are thus decisive. Furthermore, a high quality of the antennas in respect of their magnetic characteristics and as good a magnetic shielding outwards of the entire system as possible is important. If nothing else, the frequency response of the entire system is important, wherein the efficiency essentially increases with the alternating frequency of the induction field, at least up to a range of at least 100 kHz.

U.S. patent publication No. 2011/0254503 A1 discloses a system for the wireless charging of a motor vehicle by magnetic induction. The motor vehicle is equipped with a receive antenna. A transmit antenna is embedded in the floor, for instance in the region of a car parking space. Transmit and receive antennas face one another in a substantially planar manner. A positioning system which operates with a circularly polarized magnetic field and a time-reference signal, assists with ensuring as exact an alignment as possible and as small a distance as possible between the antennas.

U.S. patent publication No. 2009/0285426 A1 discloses a system for the wireless charging of a hearing instrument. The hearing instrument and charging device are equipped with a coil in each instance. The coils are inductively coupled for the purpose of transmitting energy and data. In order to achieve a good coupling, the hearing instrument must be positioned in the charging device at exactly the point provided therefore.

In order to achieve a more flexible positioning and still good coupling, so-called "charging mats" are known for cell phones (see the article Power Electronics Technology, July 2011, page 10ff) cited above. These comprise an array of planar coils, which can be switched on or off individually. As a result, a coupling to each position on the charging mat can be enabled. Suitable cell phones likewise comprise planar coils. When the cell phone is in a holder, the coils take up a predetermined orientation in respect of the storage area on account of the flat form of the cell phone. As a result, such cell phones can be freely positioned on the charging mat and a coupling to the charging mat can be established at each position.

Unlike cell phones, hearing devices are not flat but are instead rounded irregularly. Depending on the hearing loss, they may comprise a small or larger earpiece. In some instances, they are individually molded differently as in-the-ear (ITE) devices. A receive antenna in a laid-down hearing therefore does not necessarily take up a predetermined orientation in relation to the surface on which it is laid. An exact alignment of the transmit and receive coil for a hearing device on a charging mat is therefore not reliably ensured, so that it can be that insufficient power is transmitted to achieve the charging voltage.

SUMMARY OF THE INVENTION

It is accordingly an object of the invention to provide a wireless charging system for hearing instruments that overcomes the above-mentioned disadvantages of the prior art devices of this general type, wherein the hearing instrument is to be freely positionable in a charging device for charging purposes.

The invention achieves this object by means of a charging system, a charging device and a hearing instrument having the features of the respective independent claims.

A basic idea behind the invention consists in a charging device for the wireless charging of a hearing instrument, wherein the charging device has a transmit antenna arrangement, a transmit amplifier for actuating the transmit antenna arrangement and a charging space arranged within the charging device. The transmit antenna arrangement contains at least two feeding points and the transmit antenna arrangement and the feeding points are arranged spatially in relation to the charging space such that a circularly polarized electromagnetic field can thus be generated in the charging space. The transmit amplifier is to this end embodied so as to actuate the antennas accordingly in order to generate a circularly polarized electromagnetic field in the charging space.

In this arrangement the transmit antenna arrangement generates a circularly polarized HF field. To this end, the transmit antenna arrangement basically only needs to have one antenna. It could be embodied for instance as a birdcage antenna. If a number of antennas are provided, these can be embodied in various arrangements, e.g. as a remote body array. The feeding network for supplying the feeding points only needs to be embodied such that power and phase can be varied at the feeding points. The feeding network divides the transmit signal into at least two paths with adjustable phase difference Df and amplitudes A1 and A2. For a circular, circularly polarized field, A1=A2 and Df=90° must be selected for instance. The circularly polarized field makes a good resonant coupling possible even with a tilted hearing instrument, in other words with undetermined and unpredictable orientation and position of the receive coil of the hearing instrument.

The HF field in the charging space may be homogenous; it may however also be in homogenous. For instance, it can be focused on a preferred position of the hearing instrument in the charging space, and do this by switching coil elements within the transmit arrangement on and off, changing the ratio of the respective transmit powers or changing the phase of individual coils relative to one another. To this end, different instead of identical amplitudes can be set. Furthermore, phases which differ from 90° can be set in order to excite an elliptical volume for instance.

A three dimensional volume instead of as with a charging mat a two-dimensional surface is thus excited in the charging device. On account of the possible tilting of the hearing instrument, it is also expedient to configure the charging space not with a planar support area but instead in the form of a three-dimensional charging shell.

An advantageous development of the basic idea consists in the wall of the charging space including electromagnetic shielding. As a result, the resonant coupling between the transmit-antenna arrangement and a receive antenna arrangement located in the charging space is intensified.

A further advantageous development of the basic idea consists in the transmit antenna arrangement including a number of antennas. As a result, a good compromise is achieved between the design expense of the charging device and the achievable efficiency of the circularly polarized magnetic field.

A further advantageous development of the basic idea consists in the antennas being embodied as coils. Coil-type antennas allow for good control and efficiency generation of a circularly polarized magnetic field.

A further basic idea behind the invention consists in a wirelessly chargeable hearing instrument, which contains a rechargeable battery, a receive antenna arrangement, which is embodied for the resonant receiving of power, a charging facility, which is embodied for transforming the signal received by the receive antenna arrangement into a charging signal, for charging the battery by supplying the charging signal, and for controlling the charging process, and a transmit facility, which is embodied for transmitting a charging parameter value dependent on the resonant receiving of power to the charging device. The charging facility further includes a detection facility, which is embodied to detect the charging parameter value.

It is decisive that the charging system, contrary to the known arrangements (coupled individual coils, charging mats), is embodied to be resonant. The individual resonance frequency of the charging system depends on the respective hearing instrument, caused by deviations in the resonance frequency of the receiver in the hearing instrument, due to manufacturing and component tolerances.

The resonance frequency further depends on the position and orientation of the hearing instrument in the charging device. If the magnetic field adheres to the resonance frequency, a particularly efficient transmission of power from the transmit antenna arrangement to the receive antenna arrangement is produced. Consequently, a particularly high charging power develops at the resonance frequency. Conversely, the knowledge of a corresponding charging parameter value accordingly allows conclusions to be drawn as to whether the resonance frequency is adhered to.

In order to keep the complexity as low as possible in the receiver of the hearing instrument, the adjustment to the individual resonance frequency (tuning) takes place in the charging device. The tuning can take place in a digital manner, for instance with a direct digital synthesis (DDS) or in an analog manner, for instance with the aid of varactors. With the aid of a wireless communication interface between the hearing instrument and charging device, the charging parameter value relevant to the tuning can be transmitted, for instance the induced charging voltage or the induced charging current. The charging device can then vary the transmit frequency until a maximum of the charging parameter value is reached. In particular, the transmit frequency is varied.

The detection of a corresponding charging parameter value in the hearing instrument and transmission to the charging device therefore allows for a tuning to the resonance frequency by the charging device.

An advantageous development of the basic idea consists in the charging voltage and/or charging current generated on account of the resonant receipt of power being used as the charging parameters. The charging voltage and charging current are variables which are easy to detect, which also allow for direct conclusion to be drawn with respect to the charging power.

With the aid of the wireless communication interface between the hearing instrument and charging device, further data relevant to the charging process can also be transmitted, for instance the charging state of the battery, the type of battery system (for instance NiMH or Li-ion) or the capacity of the battery.

A further basic idea behind the invention consists in a charging system, which includes a charging device and a hearing instrument as described previously, wherein the charging device has a regulation facility. The regulation facility is embodied so as to receive the charging parameter value from the transmit facility of the hearing instrument, and the transmit amplifier controls the transmit antenna arrangement in dependence on the charging parameter value.

A basic requirement is thus created so as to regulate the charging device in line with the individual conditions (hearing instrument type, component tolerances, position and orientation of the hearing instrument in the charging space etc.) on account of the charging parameter value as an input variable, in order to be able to optimize the resonant coupling or efficiency of the power transmission.

An advantageous development of the basic idea consists in the transmit amplifier actuating the transmit antenna arrangement with a frequency regulated in dependence on the charging parameter value.

The decisive aspect is that the charging system, unlike the known arrangements (coupled individual coils, charging mats), is embodied to be resonant. The individual resonance frequency of the charging system depends on the respective hearing instrument and is inter alia influenced by deviations in the resonance frequency of the receiver in the hearing instrument, as a result of manufacturing and component tolerances. The resonance frequency further depends on the position and orientation of the hearing instrument in the charging device. As explained previously, the knowledge of a suitable charging parameter value allows for conclusions to be drawn with respect to the adherence to the resonance frequency. On account of the charging parameter value as an input variable, the transmitter in the charging device therefore regulates the transmit frequency in line with the individual resonance frequency in order to be able to establish a resonant coupling between the charging device and the hearing instrument.

In order to keep the complexity as low as possible in the receiver of the hearing instrument, the individual resonance frequency (tuning) is adjusted in the transmitter. The tuning can take place in a digital manner, for instance with a DDS (Direct Digital Synthesis) or in an analog manner, for instance with the aid of varactors. With the aid of a wireless communication interface, data relevant to the tuning can be transmitted from the receiver of the hearing instrument to the transmitter, for instance the induced charging voltage or the induced charging current. The transmit frequency is varied until a maximum of the position voltage or charging current is reached. In particular, the transmit frequency is changed, if the charging current or charging voltage is too low.

A further advantageous development of the basic idea consists in the transmit amplifier actuating the antennas individually with a transmit power and/or phase regulated as a function of the charging parameter value.

By changing the ratio of the respective transmit powers or changing the phase of individual coils with respect to one another, and furthermore also by switching coil elements within the transmit arrangement on and off, the circularly polarized HF field of the antenna can be modulated. A homogenous field can be generated for instance. A field focused on a preferred position of the hearing instrument in the charging device can also be generated.

The focusing of the field can, similarly to the transmit frequency, be optimized by varying the focus of the field generated by the transmit coils. To this end, by switching coil elements on and off within the transmitter arrangement, by changing the ratio of the respective transmit powers or by changing the phase of the individual coils, the charging device varies the focus until an optimization of the resonant coupling determined with the aid of the position parameter value is achieved between the charging device and the hearing instrument.

Two or more hearing instruments can advantageously also be charged with a charging device or charging system embodied as explained previously. Attention need only be paid here to keeping the alternating current in the receive coils low, since the coils couple with one another mainly by way of the B-field generated by the charging alternating current. To this end the current intensity can be set in the receive coil by balancing out the receive coil.

Other features which are considered as characteristic for the invention are set forth in the appended claims.

Although the invention is illustrated and described herein as embodied in a wireless charging system for hearing instruments, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
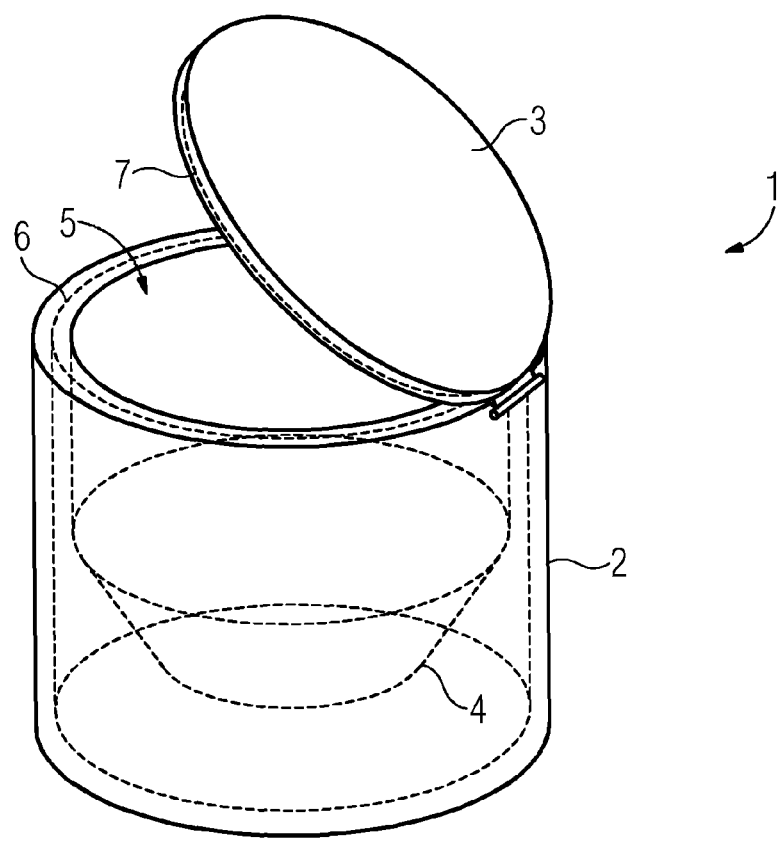
FIG. 1 is a diagrammatic, perspective view of a charging device according to the invention.

Referring now to the figures of the drawing in detail and first, particularly, to FIG. 1 thereof, there is shown a perspective representation of a charging device 1. It includes a housing 2 and a cover 3. A charging space 5 is arranged within the housing 2, in which a hearing instrument (not shown in the figure) can be charged. The charging space 5 is not embodied with a planar base, but instead the base is configured as a charging shell 4. A hearing instrument to be charged, which is introduced into the charging space 5, generally comes to lie at the lowest point in the charging shell 4.

The charging device 1 is embodied for the wireless charging of an introduced hearing instrument. For the purposes of wireless power transmission, magnetic resonance is used, by a magnetic alternating field being generated in the charging space 5. In order to improve the resonant coupling between a hearing instrument introduced in the charging space 5 and the magnetic alternating field or the transmit antenna arrangement (not shown in the figure), the charging device 1 is shielded electromagnetically. This is affected by an electromagnetic shielding 7, which is integrated in the cover 3, and by an electromagnetic shielding 6, which is integrated in the housing wall of the housing 2. The electromagnetic shielding 6, 7 are configured such that the charging space 5, with a closed cover 3, is fully shielded all around. The shielding elements may consist of metal for instance.

Figure 2:
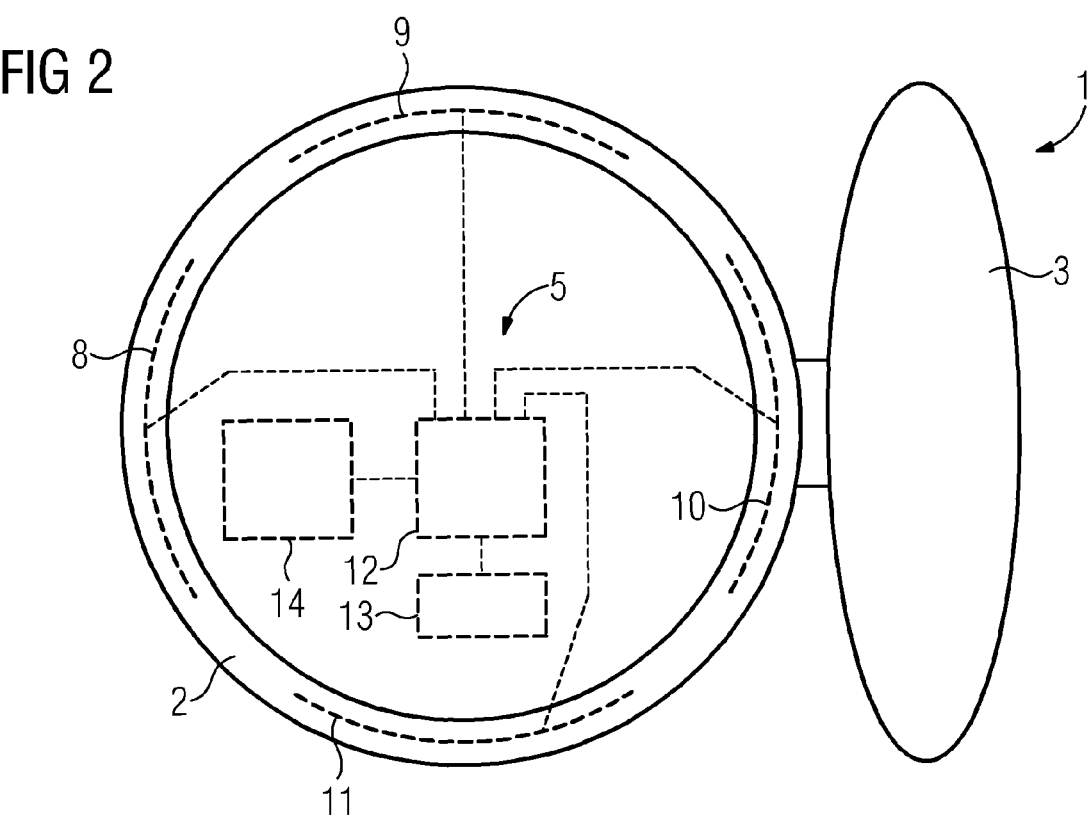
FIG. 2 is a top plan view of the charging device.

FIG. 2 shows the charging device 1 in a top view. The cover 3 is open and allows the charging space 5 to be viewed. The electronic charging system of the charging device 1 shown with dashed lines and only indicated schematically in FIG. 2 is disposed below the charging space 5. Antennas 8, 9, 10, 11 of the transmit antenna arrangement, which are indicated with dashed lines and are likewise only shown schematically are disposed in the wall of the housing 2. Each of the antennas 8, 9, 10, 11 has at least one feeding point, so that the antenna arrangement formed there contains a number of feeding points.

The antennas 8, 9, 10, 11 are arranged such that they can each generate a magnetic field orientated approximately at right angles to the wall of the housing 2. They thus enable the generation of magnetic fields in all four orthogonal spatial directions of the plane of the charging device 1 (drawing plane). When actuating the respective feeding points with the same frequency and a different phase, this arrangement allows for a circularly polarized magnetic field to be generated in the charging space 5.

The electromagnetic shielding of the housing 2 or cover 3, not shown in the figure, assists here with suppressing inhomogeneities in the magnetic field in the charging space 5, which could be caused by external influences. Furthermore, the electromagnetic shielding increases the field density in the charging space 5, thereby allowing for a more efficient transmission of charging power.

If the feeding points of the antennas 8, 9, 10, 11 are actuated with a different power in each instance, an inhomogeneous magnetic field can be generated inside the charging device 5. Furthermore inhomogeneities can also be achieved by actuation with a different phase in each instance and also by different modulation of the respective actuation signal. Furthermore, the antennas 8, 9, 10, 11 can be configured in each instance from a number of antenna elements. They are preferably embodied as coils, which can also include a number of coil elements in each instance. These allow for a further possibility of modulating inhomogeneities of the magnetic field, by individual coils elements being actuated or switched on and off differently. An inhomogeneous magnetic field in the charging space 5 is preferably focused on the lowest, central point of the charging shell 4.

The electronic charging system of the charging device 1 includes a transmit amplifier 12, a power supply 14 and a regulation facility 13. The transmit amplifier 12 obtains its operating energy from the power supply 14 and controls the antennas 8, 9, 10, 11 by control commands from the regulation facility 13. The power supply 14 may be for instance a battery, a rechargeable battery or a power supply.

The regulation facility 13 is embodied so as to regulate the transmit amplifier 12, such that a homogenous or inhomogeneous magnetic field is generated. Furthermore, it can influence a modulation of the inhomogeneous magnetic field. Furthermore, the charging electronics system can regulate the frequency and in homogeneity of the magnetic field on account of an input variable which is still to be explained, in order for instance to optimize the resonant coupling with a device to be charged.

Figure 3:
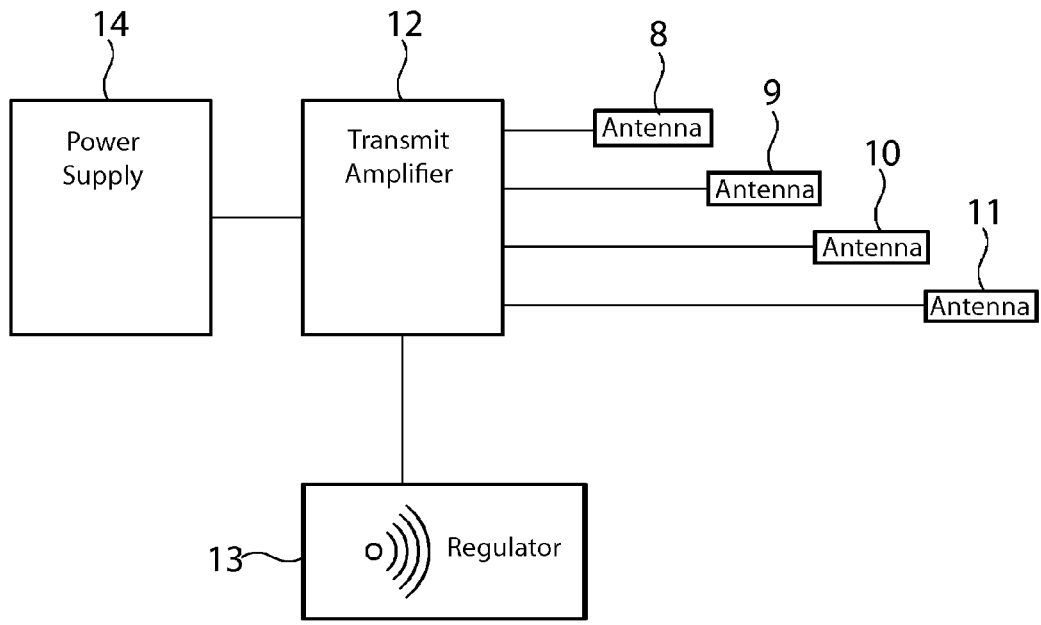
FIG. 3 is a block diagram of charging device electronics.

FIG. 3 shows the charging electronics of the charging device 1 in a schematic representation. A power supply 14 supplies the charging electronics with energy. The regulation facility 13 provides control commands for the transmit amplifier 12. The transmit amplifier 12 controls the feeding points of the antennas 8, 9, 10, 11 individually. If the antennas 8, 9, 10, 11 consist of a number of antenna elements, for instance coil elements, the transmit amplifier 12 also controls the feeding points of the antenna elements respectively and individually.

The regulation facility 13 and transmit amplifier 12 can each be realized using both analog and also digital circuit technology. In analog circuit technology, a frequency regulation can be realized for instance with the aid of varactors. Digital circuit technology is however preferably used. The output signal can be controlled in digital circuit technology for instance in DDS technology (Direct Digital Synthesis).

The transmit amplifier 12 receives control commands from the regulation facility 13 as input variables. The regulation facility 13 is used inter alia to adjust the frequency of the magnetic field in the charging space 5 to the respective individual resonance frequency. The individual resonance frequency depends above all on the design of the introduced hearing instrument and its receive antenna arrangement. Furthermore, the position and orientation of the hearing instrument or its receive antenna arrangement in the charging space 5 are decisive.

The resonance frequency consequently determined by the introduced apparatus and its position in the charging system, which is formed by the charging device 1 and the introduced apparatus, represents the magnetic field frequency in which an optimal resonant coupling is provided between the charging device 1 and the introduced apparatus. The regulation facility 13 is used inter alia to regulate the magnetic field frequency, in order to set and retain the resonance frequency.

A parameter value of the signal actually transmitted to the device to be charged can preferably be used as a regulation input variable. To this end, the regulation facility 13 is embodied such that it can receive a corresponding parameter value from a hearing instrument introduced into the charging device 1. The parameter value is preferably transmitted wirelessly. On account of such a received parameter value as an input variable, the regulation facility 13 can vary the magnetic field frequency of the magnetic field until, with the aid of a maximum of the received parameter value, an optimization of the magnetic field is determined. Inhomogeneities of the magnetic field can similarly also be optimized for instance.

Figure 4:
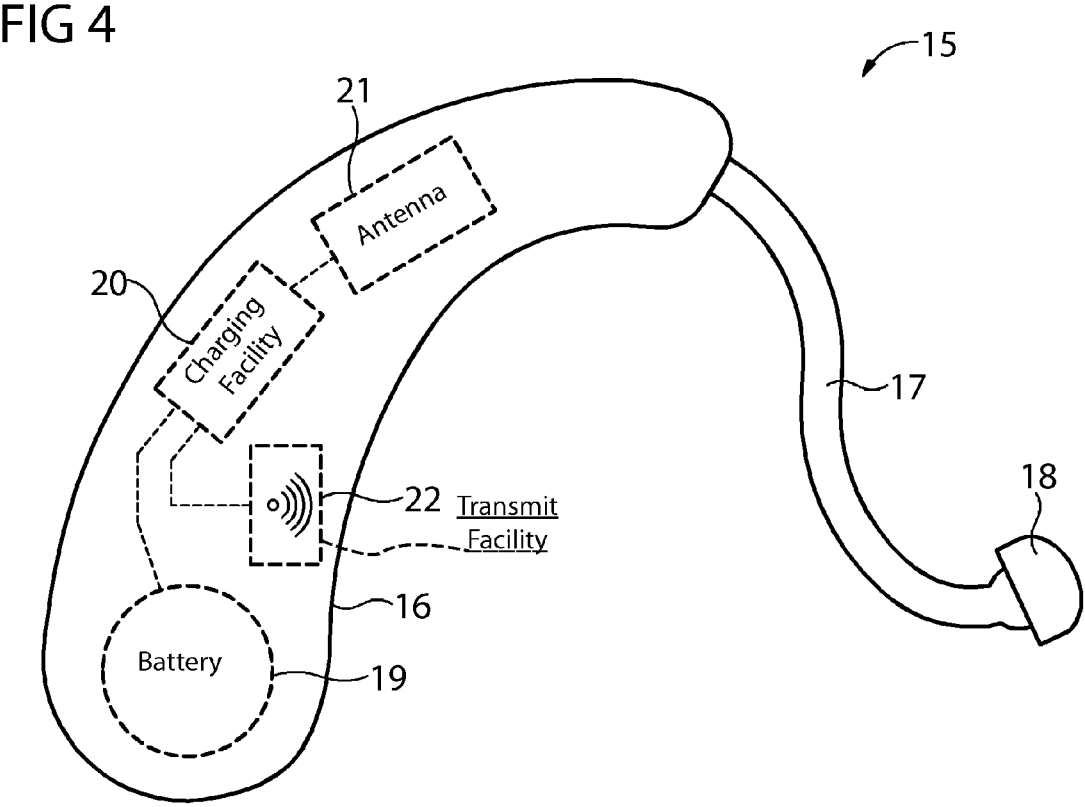
FIG. 4 is an illustration of a hearing instrument.

FIG. 4 shows a behind-the-ear (BTE) hearing device 15 in a schematic representation. It includes a BTE housing 16 and a tube 17 including earpiece 18. The hearing instrument 15 has a battery 19 for supplying energy, which is embodied as a rechargeable battery. It can be a lithium-ion battery for instance. The rechargeable battery 19 is connected to a charging facility 20, which charges the battery 19 and controls the charging process.

The charging facility 20 is provided with energy from a receive antenna arrangement 21, once power is induced into the receive antenna arrangement 21 through an external magnetic field. It includes a detection facility, which detects a charging parameter value. The charging parameter may be a charging voltage for instance, a charging current or a charging power. In this case, the detection facility includes a voltage meter and/or current meter. The charging parameter value depends decisively on the signal and the output, which the charging facility 20 receives from the receive antenna arrangement 21. Consequently, the parameter value depends decisively on the quality or efficiency of the resonant coupling of the receive antenna arrangement 21 with an external magnetic field or an external transmit antenna arrangement.

The detected charging parameter value is preferably sent wirelessly by a transmit facility 22. The transmit facility 22 and the regulation facility 13 cited previously are attuned to one another such that the regulation facility 13 can receive the charging parameters sent from the charging facility 20. The hearing instrument 15 therefore conveys the charging parameter value, by the charging facility 20 or transmit facility 22, the charging parameter value being used as an input variable for the regulation of the external magnetic field by the charging device 1 described previously. Parameters of the external magnetic field can in this way be regulated on account of the charging parameter value as an input variable, and varied in each case until a maximum of the charging parameter value is reached.

Figure 5:
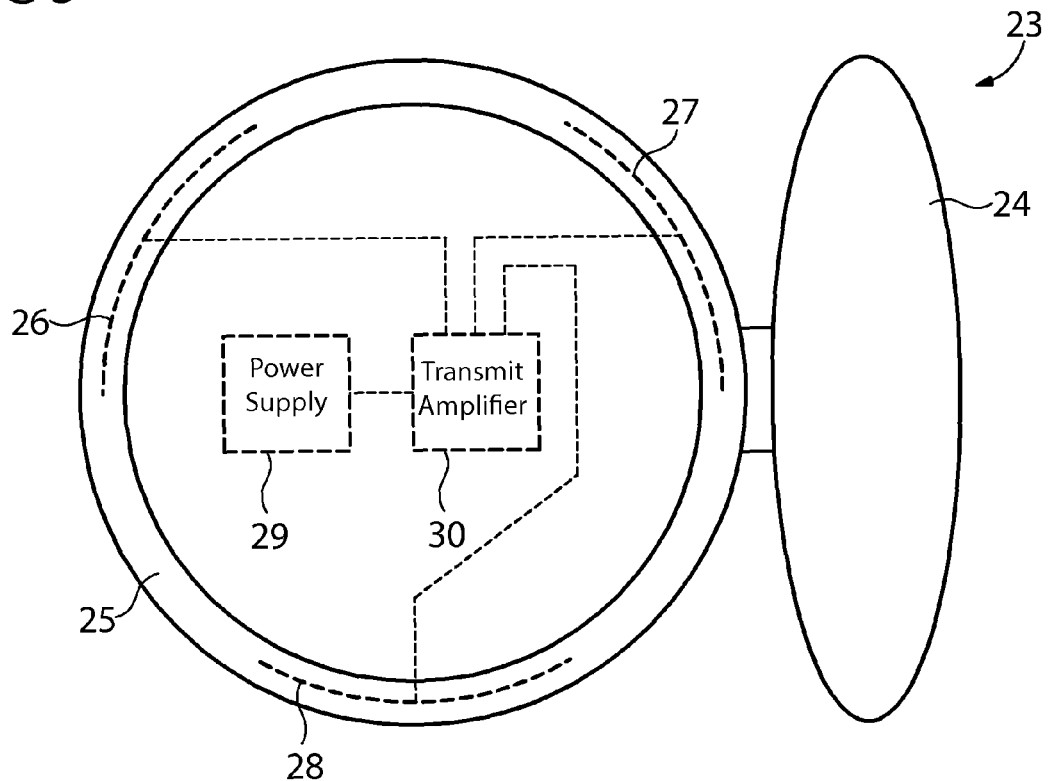
FIG. 5 is a top plan view of the charging device.

FIG. 5 shows a schematic representation of a modified variant of a charging device 23 in a top view. The charging device 23 includes a cover 24 and a housing 25. The charging device 23 likewise contains an electromagnetic shielding, which is not however shown in the figure.

A power supply 29 indicated using dashed lines supplies energy to a transmit amplifier, likewise indicated with dashed lines, with. The transmit amplifier 30 likewise controls the feeding points of the antennas 26, 27, 28 indicated respectively with a dashed line. The antennas 26, 27, 28 can each be embodied from a number of antenna elements, the feeding points of the transmit amplifier 30 of which can each actuate individually or be switched on and off. The antennas 26, 27, 28 can be configured as coils for instance, which can each be composed of a number of coil elements.

The antennas 26, 27, 28 are arranged in the wall of the housing 25 such that they can each generate a magnetic field orientated approximately at right angles thereto. By actuation with a phase which differs from one another, a circularly polarized magnetic field can be generated in the plane of the charging space of the charging device 23 (as in the drawing plane). The embodiment of the charging device 23 with three instead of four antennas 26, 27, 28 likewise allows for the generation of a circularly polarizing magnetic field, wherein the lower number of antennas nevertheless only allows for lower magnetic field homogeneity.

Figure 6:
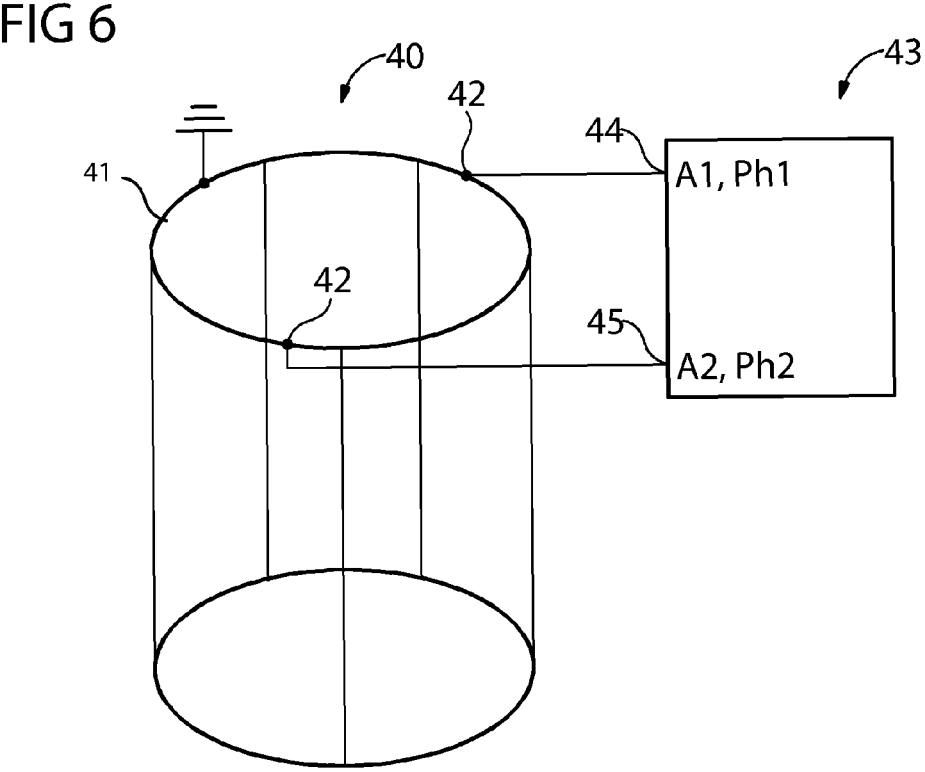
FIG. 6 is an illustration of a transmit antenna arrangement.

FIG. 6 shows a schematic representation of a transmit antenna arrangement 40 with feeding network 43. The transmit antenna arrangement 40 is shown by way of indication as a bird cage arrangement. The transmit antenna arrangement 40 includes an antenna 41, which is supplied with transmit power at two feeding points 42. The transmit power is fed in from the feeding network 43. The feeding network 43 to this end has two power outputs 44, 45, by way of which a power signal which can be set in each case in terms of amplitude and phase is output to the feeding points 42. The amplitudes A1, A2 of the respective power signal can be set by the feeding network 43, similarly the respective phase Ph1, Ph2 or the phase difference Df between the two power signals. For a circular, circularly polarized field, A1=A2 and Df=90° must be selected for instance.

The invention claimed is:

1. A charging device for wireless charging of a hearing instrument, the charging device comprising:
    a transmit antenna configuration;
    a transmit amplifier for actuating said transmit antenna configuration;
    a housing defining a charging space disposed within the charging device;
    said transmit antenna configuration having at least two feeding points, said transmit antenna configuration and said feeding points disposed spatially in relation to said charging space such that a circularly polarized electromagnetic field can be generated in said charging space; and
    said transmit amplifier connected to individually control each one of said at least two feeding points in order to generate the circularly polarized electromagnetic field.

2. The charging device according to claim 1, wherein said housing defining said charging space has a wall with electromagnetic shielding.

3. The charging device according to claim 1, wherein said transmit antenna configuration includes plurality of antennas.

4. The charging device according to claim 3, wherein said antennas are coils.

5. A charging system, comprising:
    a charging device for wireless charging of a hearing instrument, the charging device including: a transmit antenna configuration; a transmit amplifier for actuating said transmit antenna configuration; and a housing defining a charging space disposed within the charging device; said transmit antenna configuration having at least two feeding points, said transmit antenna configuration and said feeding points disposed spatially in relation to said charging space such that a circularly polarized electromagnetic field can be generated in said charging space; and said transmit amplifier connected to individually control each one of said at least two feeding points in order to generate the circularly polarized electromagnetic field; and
    a wirelessly chargeable hearing instrument including: a rechargeable battery; a receive antenna configuration embodied for a resonant receipt of power; a charging facility embodied to transform a signal received by said receive antenna configuration into a charging signal, to charge said rechargeable battery by supplying the charging signal and to control a charging process, said charging facility having a detection facility embodied to detect a charging parameter value; and a transmit facility sending the charging parameter value in dependence on the resonant receipt of power to a charging device;
    said charging device further having a regulation facility for receiving the charging parameter value from said transmit facility, and said transmit amplifier actuating said transmit antenna configuration in dependence on the charging parameter value.

6. The charging system according to claim 5, wherein said transmit amplifier actuates said transmit antenna configuration at a frequency regulated in dependence on the charging parameter value.

7. The charging system according to claim 5, wherein:
    said transmit antenna configuration includes a plurality of antennas; and
    said transmit amplifier actuates said antennas individually with a transmit power regulated in dependence on the charging parameter value.

8. The charging device according to claim 1, wherein said transmit amplifier is connected to individually control each one of said at least two feeding points in order to generate the circularly polarized electromagnetic field during the wireless charging of the hearing instrument.

9. The charging device according to claim 1, further comprising a cover, said cover and said housing being electromagnetically shielded, said housing and said cover defining therebetween the charging space disposed within the charging device.

* * * * *